(12) United States Patent
Becchi et al.

(10) Patent No.: US 7,220,803 B2
(45) Date of Patent: *May 22, 2007

(54) PROCESS FOR OBTAINING AQUEOUS POLYMER DISPERSIONS

(75) Inventors: Daniele Becchi, Reggio Emilia (IT); Stefano Finocchiaro, Viadana (IT); Mario Lugli, Fabbrico (IT); Leo Mario Saija, Bagnolo in Piano (IT)

(73) Assignee: Atofina, Puteaux (FR)

( * ) Notice: Subject to any disclaimer, the term of this patent is extended or adjusted under 35 U.S.C. 154(b) by 330 days.

This patent is subject to a terminal disclaimer.

(21) Appl. No.: 10/477,420

(22) PCT Filed: May 17, 2002

(86) PCT No.: PCT/EP02/05552

§ 371 (c)(1),
(2), (4) Date: May 18, 2004

(87) PCT Pub. No.: WO02/092637

PCT Pub. Date: Nov. 21, 2002

(65) Prior Publication Data

US 2004/0209992 A1    Oct. 21, 2004

(30) Foreign Application Priority Data

May 17, 2001    (IT)    ......................... MI2001A1013

(51) Int. Cl.
*C08F 2/22*    (2006.01)
(52) U.S. Cl. ........................... 526/71; 526/87; 526/88; 526/318.4; 526/328; 526/328.5
(58) Field of Classification Search .................. 526/71, 526/87, 88, 318.4, 328, 328.5
See application file for complete search history.

(56) References Cited

U.S. PATENT DOCUMENTS

| 3,637,563 | A | * | 1/1972 | Christena | ..................... 523/305 |
| 4,642,323 | A | | 2/1987 | Ranka et al. | ................ 524/458 |
| 6,028,135 | A | * | 2/2000 | Keller et al. | ................ 524/458 |
| 6,225,401 | B1 | | 5/2001 | Rehmer et al. | ............. 524/800 |

FOREIGN PATENT DOCUMENTS

| DE | 197 48 546 A1 | | 5/1999 |
| DE | 19748546 A1 | * | 5/1999 |

* cited by examiner

*Primary Examiner*—Kelechi C. Egwim
(74) *Attorney, Agent, or Firm*—Whyte Hirschboeck Dudek SC

(57) ABSTRACT

The process comprises the following phases: formation of a pre-emulsion of monomers in water; transfer into the polymerisation reactor with stirring, of (1) reaction stock consisting of a water solution of a surfactant, in an amount by weight relative to the weight of final polymer dispersion of 1–15%; (2) a portion of the pre-emulsion prepared in the previous phase, in an amount of 1%–10% by weight of the initial pre-emulsion; phase C.1: initiation of the polymerisation ; phase C.2: polymerisation of the monomer mixture at 30–90° C., by gradually adding into the reactor, separately, the initiator solution and the remaining portion of the pre-emulsion with an added salt, which is soluble in water at 25° C. to at least 1% by weight, in an amount so as to have a salt concentration in the added pre-emulsion of 0.02–0.25% by weight; phase C.3: scrubbing of the residual monomers.

15 Claims, No Drawings

PROCESS FOR OBTAINING AQUEOUS POLYMER DISPERSIONS

The present invention relates to a process for producing aqueous polymer dispersions with a high solids content, reduced viscosity and a very low content of micro-aggregates, and substantially free of macro-aggregates.

More particularly, the present invention relates to a process for preparing aqueous polymer dispersions having:
- a solids content of greater than or equal to 65%;
- Brookfield viscosity of less than 3 000 mPa·s, measured at 23° C. under the following conditions: up to 400 mPa·s using a No. 2 spindle at 100 rpm, from 400 to 700 mPa·s using a No. 2 spindle at 20 rpm, from 700 to 3 000 mPa·s using a No. 3 spindle at 20 rpm;
- content of dry micro-aggregates of less than 500 ppm and preferably less than 200 ppm;
- content of wet macro-aggregates, relative to the weight of the final dispersion, of less than 0.2%.

Preferably, the aqueous polymer dispersions are based on acrylic polymers with a Tg of between about −60° C. and about +40° C.

As it is known, aqueous polymer dispersions have the property of forming polymer films after evaporation of the dispersing medium, and for this reason are widely used in various fields of application, for example as binders for sealant formulations, adhesives, varnishes, paints, cement-based mortars and coatings, and products for processing paper, textiles and leather.

It is also known that, for various applications, aqueous polymer dispersions with a high solids concentration are required, since these have various industrial advantages. For example, they make possible to reduce the transportation and storage costs and they require shorter times and reduced power consumption to remove the water during the application phases. In addition, in the application of aqueous polymer dispersions as binders for the manufacturing of sealant formulations, the use of dispersions with a high solids content makes it possible to obtain products with high performance qualities, having controlled shrinkage upon drying.

A possible drawback of aqueous polymer dispersions with a high solids content is that they generally have a high viscosity. This has a negative impact on the process for producing the aqueous polymer dispersion and appreciably limits its field of application. In point of fact, the polymerization of high-viscosity products requires the use of suitable stirring systems to avoid the build-up of the heat of reaction, and to allow good scrubbing of the residual monomers.

It is known in the literature that polymodal distributions of the polymer particle sizes give aqueous dispersions viscosities that are very much lower than those of monomodal distributions.

Processes for obtaining dispersions of organic polymers in water, with a bimodal or polymodal distribution of the mean particle diameter, are known in the art. These processes, although making possible to obtain dispersions with a high solids content and relatively low viscosities, have various drawbacks.

Patents U.S. Pat. No. 6,028,135 and DE 19 748 546 describe processes for obtaining aqueous polymer dispersions with a solids content of greater than 50% and low viscosities, in which a preformed polymer seed is used. These processes are disadvantageous since the preformed seed technique increases the production costs. For example, the dispersion with the polymer seed must be produced and stored in order to allow successive polymerisations to be carried out.

Patent WO 98/07767 describes a process for preparing aqueous polymer dispersions with a high solids content and a Tg of not more than 0° C., in which a polymer seed is not used, but rather a particular procedure for feeding in the monomers, in which the amount of optional inhibitors present in the reaction system is less than 50 ppm; an amount equal to 1–10% of the monomer emulsion is fed in from 15 minutes to 60 minutes from the start of the polymerisation, which is carried out in the presence of conventional surfactants and free-radical polymerisation initiators. Optionally, a "reaction stock" may be used (a solution that is transferred into the polymerisation reactor before initiating the reaction), consisting of an aqueous solution that may contain a soluble salt. In the examples of said patent, aqueous polymer dispersions of low viscosity are described. In particular, during the initial phase of the polymerisation, high salt/surfactant weight ratios (greater than 100 during the first 5 minutes of polymerisation) are used. The Applicant has found that by working with such salt/surfactant ratios and using a polymerisation process similar to the one described in the examples of said patent, high viscosities are obtained, or macro-aggregates in an unacceptable amount (see the comparative examples) are produced. Thus, the teaching of patent WO 98/07767 is applicable only if the phases described in the examples reported therein are followed exactly.

There is thus a need to have available a process for free-radical polymerisation in aqueous emulsion, that makes possible to obtain aqueous polymer dispersions with a high solids content and a very low viscosity as defined above, while avoiding the addition of a polymer seed and using lower amounts of surfactants, which is simple to perform and readily applicable on an industrial scale.

The Applicant has found, surprisingly and unexpectedly, a process for free-radical polymerisation in aqueous emulsion, which solves the technical problem mentioned above.

One subject of the present invention is a process for obtaining an aqueous polymer dispersion having the following properties:
- a solids content of from 65% to 75% by weight;
- Brookfield viscosity of less than 3 000 mPa·s, measured at 23° C. under the following conditions: up to 400 mPa·s using a No. 2 spindle at 100 rpm, from 400 to 700 mPa·s using a No. 2 spindle at 20 rpm, from 700 to 3 000 mPa·s using a No. 3 spindle at 20 rpm;
- content of micro-aggregates of less than 500 ppm and preferably less than 200 ppm;
- content of wet macro-aggregates, relative to the weight of the final dispersion, of less than 0.2% by weight;
- the particles of the said dispersion having a polymodal distribution of the mean diameter, and the following distribution of the mean diameters:
  - mean diameter of less than 500 nm: from 0 to 40% by weight,
  - mean diameter from 300 to 500 nm: from 0 to 40% by weight,
  - mean diameter of greater than 500 nm: from 40 to 95% by weight,
  - the sum of the percentages of the particles being 100% by weight,
- the said process being carried out by free-radical polymerisation in aqueous emulsion of unsaturated monomers, that are preferably hydrogenated, according to the following phases:

formation of a pre-emulsion of monomers in water using surfactants, where a water-soluble salt can be optionally added from this stage, said salt being soluble in water at 25° C. to at least 1% by weight;

transfer into the polymerisation reactor with stirring, in the following order, of the following aqueous phases:

"reaction stock" consisting of: a solution of a surfactant, in an amount by weight relative to the weight of final polymer dispersion, that is to say the dispersion with all the components added, of from 1 to 15%; optionally with an added salt, which is soluble in water at 25° C. to at least 1% by weight and is inert under the reaction conditions; the salt/surfactant (s/s) weight ratio in the reaction stock being less than 70 and preferably less than 60;

a portion of the pre-emulsion prepared in the previous phase, in an amount of from 1% to 10% by weight of the initial pre-emulsion;

phase C.1 initiation of the polymerisation, by adding free-radical initiators that may be activated thermally, chemically or by UV irradiation;

phase C.2 polymerisation of the monomer mixture, by gradually adding into the reactor, separately, the initiator solution and the remaining portion of the pre-emulsion with an added salt, which is soluble in water at 25° C. to at least 1% by weight and is inert under the reaction conditions, in an amount so as to have a salt concentration in the added pre-emulsion, expressed as a percentage by weight, of from 0.02 to 0.25% and preferably from 0.05 to 0.2%; the polymerisation temperature generally being from about 30° C. to about 90° C.;

phase C.3 scrubbing of the residual monomers.

In case where a salt is added during the formation of the pre-emulsion, the weight proportion of this salt with respect to this pre-emulsion fulfills the same conditions as those abovementioned for phase C.2. Furthermore, this salt can be the same as the one introduced in phase C.2; it can also be different, knowing that it must be inert under the reaction conditions.

The salt is preferably added to the pre-emulsion during phase C.2.

When a salt that is soluble at 25° C. in water to at least 1% by weight is used during the polymerisation process at the concentrations and ratios defined above, it is possible to obtain polymodal distributions of the sizes of the polymer particles in which the fractions of particles having, respectively, a mean diameter of less than 300 nm, of between 300 and 500 nm, and of greater than 500 nm, are as indicated above.

The weight distribution of the sizes of the polymer particles is determined by using a method of particle fractionation by means of hydrodynamic chromatography (CHDF) or, in the cases where the sizes of the larger particles present in the dispersion exceed the operating limits of the instrument (about 800 nm), by means of transmission electron microphotography.

The amount of water-soluble salt as defined above that is used in the process corresponds to a weight concentration, relative to the total weight of the polymer dispersion of from about 0.01 to about 1% and preferably from about 0.05 to about 0.5% by weight.

The pre-emulsion in phase C.2 may be fed into the reactor by constant flow or, preferably, according to a rate gradient, preferably initially using a lower flow.

The composition of the monomers emulsion can remain constant throughout the polymerisation process, or can be varied by successive increments, or continuously, depending on the required properties of the final product. An example of variation of the monomer composition by successive increments is the synthesis of structured polymers of core-shell type and the like, that are known in the literature.

At the end of the process, the residual monomers are removed by means of either chemical or physicochemical methods. An example of a physicochemical method is the steam-stripping of the residual monomers. A chemical process for reducing the free monomers content consists, for example, in feeding into the reactor a further aliquot of initiator and in carrying out the heating at the polymerisation temperatures mentioned above for a period of time ranging from 10 minutes to 3 hours. It is also possible to combine the two processes for stripping out the monomers.

The salts that are water-soluble to at least 1% by weight and that may be used in the process of the present invention may be either mineral or organic salts, and they may also be neutral, basic or acidic.

The preferred salts are mineral salts and salts of mineral cations with $C_1$–$C_4$ monocarboxylic and $C_2$–$C_4$ dicarboxylic aliphatic acids.

For example, mention may be made of salts of alkali metals and alkaline-earth metals (sodium or potassium sulphates, halides, phosphates, pyrophosphates or nitrates, magnesium sulphate, nitrate and halides, calcium halides and nitrate, etc.), water-soluble salts of transition metals (for example iron, titanium, copper, cobalt, etc. sulphates, nitrates and chlorides), water-soluble salts of complex ions, such as ammonium sulphate, chloride or nitrate.

Examples of salts of mineral cations with organic acids are, for example, sodium or potassium acetate and sodium succinate.

The ethylenically unsaturated monomers used in the process according to the present invention are preferably esters of monocarboxylic or dicarboxylic α,β-unsaturated $C_3$–$C_{10}$ aliphatic acids with $C_1$–$C_{12}$ and preferably $C_1$–$C_8$ aliphatic alkanols, or $C_5$–$C_8$ cycloaliphatic alkanols, preferably as a mixture with monocarboxylic or dicarboxylic α,β-unsaturated $C_3$–$C_{10}$ aliphatic acids, optionally in the presence of other ethylenic monomers.

The monocarboxylic or dicarboxylic α,β-unsaturated $C_3$–$C_{10}$ aliphatic acids included in the monomer mixture and that may also be used to obtain the esters of this mixture are, for example, acrylic acid, methacrylic acid, crotonic acid, maleic acid, fumaric acid and itaconic acid, and preferably (meth)acrylic acid.

Examples of alkanols that can react with the acids mentioned above to obtain esters are methanol, ethanol, n-propanol, isopropanol, 1-butanol, 2-butanol, isobutanol, tert-butanol, n-hexanol and 2-ethylhexanol. Examples of cycloalkanols that may be used are cyclopentanol and cyclohexanol.

Preferably, in the process of the invention, the majority of monomer emulsion, that is to say an amount of greater than 70% by weight, consists of esters of monocarboxylic or dicarboxylic α,β-unsaturated $C_3$–$C_{10}$ aliphatic acids with $C_1$–$C_{12}$ aliphatic alkanols or $C_5$–$C_8$ cycloaliphatic alkanols, optionally in the presence of a small amount of monocarboxylic or dicarboxylic α,β-unsaturated $C_3$–$C_{10}$ aliphatic organic acids.

Specific examples of these preferred esters are methyl, ethyl, n-butyl, isobutyl and 2-ethylhexyl (meth)acrylate, dioctyl maleate and di-n-butyl maleate.

The weight ratio of the acid to the ester ranges from about 1:10 to about 1:350.

The classes of monomers described above normally constitute the majority of the monomer mixture, in an amount of at least 70% by weight.

The other unsaturated ethylenic monomers that may be used in the process of the present invention are, for example, the following: vinylaromatic monomers, for instance styrene and its derivatives; $C_1$–$C_{12}$ alkyl vinyl ethers, for instance methyl, ethyl, n-propyl, isopropyl, n-butyl, isobutyl and 2-ethylhexyl vinyl ether; vinyl esters of $C_1$–$C_{18}$ aliphatic monocarboxylic acids, for instance vinyl acetate, vinyl propionate, vinyl butyrate, vinyl valerate, vinyl hexanoate, vinyl 2-ethylhexanoate, vinyl decanoate, vinyl laurate and vinyl stearate.

Other unsaturated ethylenic monomers for modifying the properties of the polymer, for example as regards the water absorption and the wetting capacity relative to the optional mineral fillers, may also be added to the polymer mixture.

Non-limiting examples of these monomers are amides of the α,β-unsaturated monocarboxylic and dicarboxylic $C_3$–$C_{10}$ aliphatic acids mentioned above, preferably (meth)acrylamide.

Monomers containing hydroxyl groups may be used, for example hydroxy esters of the α,β-unsaturated monocarboxylic and dicarboxylic $C_3$–$C_{10}$ acids mentioned above with $C_2$–$C_{12}$ alkanediols. Examples of these monomers are hydroxyethyl(meth)acrylate, hydroxypropyl(meth)acrylate and hydroxybutyl(meth)acrylate.

Other monomers that may be used in the polymerisation process according to the present invention are nitriles of α,β-unsaturated monocarboxylic and dicarboxylic $C_3$–$C_{10}$ acids, for instance (meth)acrylonitrile.

Crosslinking monomers may be added to the monomer mixture for the purpose of modifying the mechanical properties of the polymer, in amounts generally not greater than 3% and preferably from 0.1% to 1% by weight relative to the monomer formulation. Examples of these monomers are N-methylolacrylamide, di(meth)acrylates and tri(meth)acrylates of $C_2$–$C_5$ alkylene glycols, in particular of ethylene glycol and of propylene glycol, vinylsiloxanes containing $C_1$–$C_8$ aliphatic alcohols, divinylbenzene, vinyl(meth)acrylate, allyl(meth)acrylate, diallyl maleate, diallyl fumarate and triallyl cyanurate.

The process of the invention may be applied in particular to the preparation of polymer dispersions obtained by polymerising a monomer mixture comprising: one or more of the (meth)acrylic acid esters mentioned above, (meth)acrylic acids, (meth)acrylic acid hydroxy esters, a crosslinking agent, styrene.

Preferably, the said dispersions are prepared by polymerising the above mentioned monomers, in the following amounts:

from 70 to 99.7% by weight of at least one ester of (meth)acrylic acid with $C_1$–$C_{12}$ alkanols as defined above;
from 0.3 to 5% by weight of (meth)acrylic acid;
from 0 to 5% by weight of hydroxy esters of (meth)acrylic acid with $C_1$–$C_{12}$ alkanols;
from 0 to 2% of a monomer with crosslinking properties;
from 0 to 15% by weight of styrene;
from 0 to 15% by weight of vinyl acetate.

The surfactants used in the process of the invention may be nonionic and/or anionic or cationic or mixtures thereof; mixtures of anionic and nonionic surfactants are preferably used.

Examples of surfactants are ethoxylated mono-, di- and trialkylphenols with a number of ethoxyl (EO) units of between 3 and 50 and $C_4$–$C_9$ alkyl chains; ethoxylated fatty alcohols with a number of EO units of between 3 and 50 and $C_8$–$C_{36}$ alkyl chains; ammonium or alkali metal salts of $C_8$–$C_{12}$ alkyl sulphates; hemiesters of sulphuric acid with ethoxylated $C_{12}$–$C_{18}$ alkanols with a number of EO units of between 4 and 50; $C_{12}$–$C_{18}$ alkylsulphonic acids or alkylarylsulphonic acids with 6 carbon atoms in the aromatic ring and $C_9$–$C_{18}$ alkyl chains.

Other examples of surfactants that may be used in the process of the invention are ethers of bis(phenylsulphonic acid) and ammonium and alkali metal salts thereof, containing a $C_4$–$C_{24}$ alkyl chain on one or both of the aromatic rings. These compounds are known and are obtained as described, for example, in patent U.S. Pat. No. 4,269,749. They are commercially available under the brand name Dowfax® 2A1.

Protective colloids may optionally also be used in the process of the invention. Non-limiting examples of protective colloids are polyvinyl alcohols, cellulose derivatives and vinylpyrrolidone copolymers.

The total amount of surfactants and optional protective colloids is between 0.5 and 5% as a percentage by weight relative to the polymer dispersion obtained by the process of the invention, preferably from 0.75 to 3.5% by weight and more preferably from 1 to 2.5% by weight.

The polymerisation is carried out, as stated, in the presence of free-radical initiators activated thermally, by UV irradiation or chemically. Non-limiting examples of these systems are ammonium and alkali metal salts of peroxydisulphates, azo compounds, redox couples optionally catalysed by the use of metal cations having more than one oxidation state, for instance Fe or Co. Examples of these compounds are ammonium and sodium peroxydisulphates, azobisisobutyronitrile (AIBN), couples formed from at least one peroxide or hydroperoxide (for example tert-butyl hydroperoxide) and the sodium salt of hydroxymethanesulphinic acid, or hydrogen peroxide with ascorbic acid. Redox couples catalysed by metal salts having more than one oxidation state are represented, for example, by the ascorbic acid/ferrous sulphate/hydrogen peroxide system, in which the ascorbic acid may be replaced with one of the following compounds: sodium salt of hydrozymethanesulphinic acid, sodium sulphite, sodium hydrogen sulphite, sodium metabisulphite, sodium formaldehyde sulphoxylate; the hydrogen peroxide may be replaced with tert-hydrobutyl peroxide and with ammonium or alkali metal peroxydisulphates.

The amount of free-radical initiators used is preferably from 0.1 to 2% by weight relative to the monomer mixture.

An agent for controlling the length of the polymer chain and its molecular weight, for instance a chain-transfer agent, may optionally also be used in the polymerisation reaction. The amount of these compounds is from 0.01 to 5% by weight relative to the monomer mixture. Examples that may be mentioned are mercaptan compounds, for instance mercaptoethanol, mercaptopropanol, mercaptobutanol, mercaptoacetic acid, mercaptopropionic acid, butyl mercaptan and n-dodecyl mercaptan. These substances are preferably added into the polymerisation as a mixture with the monomers to be polymerised.

The process according to the present invention has the following advantages: it has an excellent reproducibility, it is easy to perform on an industrial scale, it uses limited amounts of surfactants, it does not cause fouling of the reactors or formation of aggregates in a substantial quantity. Mixtures consisting of monomers of a wide variety of types and amounts may also be used for the polymerisation. As stated, the process of the invention also makes it possible to obtain aqueous polymer dispersions substantially free of residual monomers, and having the amounts of coarse aggregates (macro-aggregates) and micro-aggregates as indicated.

The process of the invention produces aqueous polymer dispersions with a solids content of about from 65 to about 75% by weight relative to the total weight of the dispersion, and having a viscosity of less than 3 000 mPa·s (ISO 2555, Brookfield RVT, 23° C., measured under the following conditions: up to 400 mPa·s with a No. 2 spindle at 100 rpm, from 400 to 700 mPa·s with a No. 2 spindle at 20 rpm, from 700 to 3 000 mPa·s with a No. 3 spindle at 20 rpm), preferably less than 2 000 mPa·s, the amount of micro-aggregates preferably being less than 200 ppm and that of macro-aggregates less than 0.2%.

Without wishing to subscribe to any theory, the results of the present invention may be attributed to the fact that the process of the invention produces polymodal distributions of the sizes of the dispersed polymer particles, in which the fraction of particles with a mean diameter of greater than 500 nm, determined by the methods indicated above, is at least about 40% by weight relative to the total weight of the polymer.

It is possible by means of the process of the present invention to prepare aqueous polymer dispersions containing polymers with a Tg from about −60 to about +40° C.

The final polymer dispersion that may be obtained according to the process described in this invention is particularly suitable for use as a binder in the formulation of seals, pressure-sensitive adhesives, water-based paints and water-based varnishes, cement-based mortars and coatings and/or elastic cement claddings, and products for treating fabrics, leather, paper, wadding and non-woven fabrics.

The formulations that may be obtained from the polymer dispersions prepared by the process described in the present invention may optionally comprise additives such as, for example, coalescing agents, plasticizers, mineral and organic fillers, pigments, crosslinking agents, photosensitizers, scratch-resistant agents, antifoams, biocides, etc.

Said additives can be mixed directly with the polymer dispersion.

The addition of salt during the polymerisation under the conditions described in the process of the present invention is essential for obtaining aqueous polymer dispersions having the properties described above. The reason for this is that when the entire amount of the water soluble salt is added from the very start to the reaction stock, causing the weight ratio salt/surfactant (s/s) in the reaction stock be higher than 70, it is not possible to obtain a polymer dispersion having the advantageous properties of the dispersions according to the present invention, as will be seen in the comparative examples.

The examples which follow illustrate the invention without, however, limiting its scope.

EXAMPLES

Analytical Methods

Determination of the Size Distribution of the Dispersed Polymer Particles by Means of Hydrodynamic Fractionation Chromatography (CHDF)

The size distribution of the dispersed particles in the polymer dispersions subjected to study was obtained by using a fractionation method by means of hydrodynamic chromatography (CHDF) with a Matec Applied Sciences® CHDF 2000 instrument, using standard aqueous polystyrene dispersions supplied by Dow® Chemicals as reference samples.

Determination of the Size Distribution and Morphology of the Dispersed Polymer Particles by Means of Transmission Electron Microphotography The size distribution and the morphology of the dispersed particles in the polymer dispersions containing a significant fraction with a mean diameter of greater than 800 nm was determined by using transmission electron microphotography with a LEO 902 instrument, with an acceleration voltage of 80 KV, after the polymer particles have been stained by adding an aqueous solution containing 2% by weight of phosphotungstic acid. The particle diameter was calculated as the arithmetic mean between the minimum and maximum diameter of the particles shown in the microphotographs.

Determination of the Solids Content

The solids content of the dispersions of the invention was measured by drying the samples under investigation according to procedure EN 827. The samples were dried in a ventilated oven at a temperature of 105° C. for 60 minutes. The result is expressed as a percentage of non-volatile compounds relative to the original weight of the sample.

Determination of the Wet Macro-Aggregate

The wet macro-aggregate present at the end of the reaction was determined by filtering the polymer dispersion during the phase of discharging the reactor, with a 36-mesh screen. The polymer collected on the screen was then weighed after washing with deionised water and removal of the excess water by draining and gentle pressing. Any blocks of polymer still remaining in the reactor are also weighed and thus taken into consideration in the determination.

Determination of the Micro-Aggregate

The determination of the micro-aggregate is carried out by filtration through a 120-mesh screen, followed by washing with demineralised water and drying of any residue retained on the screen in an oven for 15 minutes at 135° C. The micro-aggregates amount is calculated in ppm, relative to the weight of the filtered dispersion.

Determination of the Viscosity

The viscosity of the dispersions was measured in accordance with the ISO procedure 2555, using a Brookfield viscometer (RVT model). The determinations were carried out at a temperature of 23° C. The type of spindle and the rotation speed used are indicated in the examples.

Determination of the Glass Transition Temperature (Tg) of the Polymers in the Dispersions The glass transition temperature was determined with a Perkin Elmer DSC Pyris®1 instrument using 40 µl pans and an operating cycle comprising the following phases:
1) maintaining the sample at −90° C. for one minute,
2) heating from −90° C. to +20° C. at a rate of 20° C./min,
3) cooling from +20° C. to −90° C. at a rate of 40° C./min,
4) repeating phases 2) and 3).

Example 1

General Process for Preparing the Polymer Dispersions

The process is conducted in the following phases:

A) Preparation of the "Reaction Stock" Solution

An amount of demineralised water of between 800 g and 950 g, depending on the solids content of the polymer dispersion to be obtained, and 0.2 g of an aqueous 45% solution of the surfactant Dowfax® 2A1 (see the description) are introduced into a 12-liter reactor equipped with an impeller stirrer rotating at angular speeds of between 50 and 300 rpm. In some of the examples described further, the reaction stock also optionally contains, in addition to the surfactant, the water-soluble salt.

The solution is then heated under a nitrogen atmosphere up to a temperature of 79–80° C.

The aqueous solution containing the surfactant and optionally the water-soluble salt is referred to in the examples as the "reaction stock".

B) Preparation of the Pre-emulsion

A pre-emulsion containing the polymerisation monomers and an amount of demineralised water of between 800 g and 1 000 g, depending on the desired solids content, is prepared in a glass 10-liter round-bottomed flask equipped with a high-speed stirrer. The following surfactants are added as stabilizers for the monomers pre-emulsion:

Emulan® TO2080 (mixture of ethoxylated fatty alcohols with 20 EO units) as an aqueous solution at 80% by weight.

Emulan® TO4070 (mixture of ethoxylated fatty alcohols with 40 EO units) as an aqueous solution at 70% by weight.

Optionally, the salt may be added beforehand in this phase.

C) Polymerisation

C.1 Initiation Phase

A portion of the monomers pre-emulsion (200–300 g) is transferred, by means of an adjustable feed pump, into the reactor containing the reaction stock heated to 79–80° C. The temperature inside the reactor is stabilised at 78–79° C. and 22 g of an aqueous solution at 10% by weight of sodium peroxydisulphate (NaPDS) are rapidly added, with stirring, to initiate the polymerisation reaction.

Except where otherwise specified, the water-soluble salt used in the examples is sodium sulphate.

The initiation process is continued until the maximum temperature is reached, which is generally 1–5° C. higher than the initial temperature of the emulsion. The maximum temperature is reached 5–10 minutes after adding the free-radical initiator.

C.2 Polymerisation

Separately, an aqueous solution containing from 65 to 90 g of an aqueous solution containing 45% by weight of the surfactant Dowfax® 2A1 and from 45 g to 120 g of demineralised water, the amount of water depending on the required solids content, and optionally the water-soluble salt in the amount indicated in the examples, is prepared.

This aqueous solution is added to the remaining pre-emulsion, and the mixture obtained is fed into the reactor starting from one minute after reaching the maximum temperature.

The temperature at which the polymerisation takes place is between 80 and 84° C.

A solution containing 5% by weight of sodium peroxydisulphate is simultaneously fed into the same reactor, by means of a pump, the flow being adjusted such that the feed of the initiator solution continues for about 40 minutes after having stopped the addition of the mixture containing the monomer pre-emulsion. The continued feeding of the peroxide solution serves to scrub out any free monomers remaining in the polymer dispersion.

In a first phase of the polymerisation, an amount of monomer mixture equal to about 5% of the pre-emulsion is fed in over a period of 30 minutes.

In a second phase, the remaining portion of the monomer mixture is fed in.

The initiator/monomers weight ratio at the end of the reaction is approximately equal to 0.4%.

Once the addition of the initiator solution is complete, the dispersion in the reactor is maintained at the reaction temperature for a further 15 minutes approximately.

C.3 Scrubbing of the Residual Monomers

Any residual free monomers after the phases of the polymerisation process described above are removed by adding a redox couple of free-radical initiators, by simultaneously feeding into the reactor over a period of 60 minutes and at a temperature of 75–80° C. an amount equal to 30–35 g of an aqueous solution containing 13% by weight of tert-butyl hydroperoxide (TBHP) and, over a period of 75 minutes, an amount equal to 80–85 g of a solution containing 4% by weight of sodium formaldehyde sulphoxylate (SFS). Next, the temperature inside the reactor is maintained at 75–80° C. for a further 15 minutes.

The polymer dispersion is then cooled to room temperature, antifoaming agents, pH regulators and/or biocides are optionally added, and it is then discharged.

During the various phases of the polymerisation process, the stirring regime of the reactor is 110–130 rpm for the dispersions obtained by the process according to the present invention and is gradually increased up to about 200 rpm for the polymer dispersions of higher viscosity, obtained by the processes described in the comparative examples.

Comparative Example 1A

Polymerisation According to the General Procedure of Example 1, in the Absence of Water-Soluble Salt The monomers used were as follows: butyl acrylate (BA), methacrylic acid (MAA), hydroxyethyl methacrylate (HEMA), styrene (S), as a mixture with the crosslinking agent triethylene glycol dimethacrylate (TEGDMA).

The amounts of monomers used and the composition of the monomer mixture as a percentage by weight are given in Table I.

Table IIA gives the amounts of the various compounds that were added to prepare the reaction stock and the monomer pre-emulsion.

Tables IIIA and IVA give the amounts of the reaction stock, of the monomer pre-emulsion, of the other reagents and of water, which were added during the polymerisation.

The final scrubbing of the monomers was performed by adding 30 g of a 13% TBHP solution and 80 g of a 4% SFS solution over the times respectively indicated in Example 1.

Table VA shows the properties of the polymer dispersion obtained: the solids content, the Brookfield viscosity, determined using a No. 6 spindle at 20 rpm, the particle sizes, the micro-aggregates (ppm) and the Tg in ° C. of the polymer.

Comparative Example 2

Polymerisation According to the General Procedure of Example 1, in the Absence of Salt, with Two Distinct Initiation Phases+a Waiting Phase between the Two Initiations The monomers and the crosslinking agent used are the same as in Comparative Example 1A.

The amounts of each monomer used and the composition of the monomer mixture in percentages by weight are given in Table I.

Table IIA gives the amounts of the various compounds that were added to prepare the reaction stock and the monomer pre-emulsion.

Tables IIIA and IVA show the amounts, respectively, of the reaction stock, of the pre-emulsion, of the other reagents and of water, that were added during the polymerisation phase.

The final scrubbing of the monomers was performed by adding 30 g of 13% TBHP solution and 80 g of 4% SFS solution at the times respectively indicated in Example 1.

Table VA shows the characteristics of the polymer dispersion obtained: the solids content, the Brookfield viscosity determined using a No. 6 spindle at 20 rpm, the particle sizes, the micro-aggregate (ppm) and the Tg in ° C. of the polymer.

Comparative Example 3

Polymerisation Process in which all the Salt was Added to the Reaction Stock

Salt was dissolved in the reaction stock to a concentration of about 1% by weight.

The monomers used were as follows: BA, methyl methacrylate (MMA), MAA, HEMA, as a mixture with the crosslinking agent TEGDMA.

The amounts of each monomer used and the composition of the monomer mixture in percentages by weight are given in Table I.

Table IIA shows the amounts of the various compounds that were added to prepare the reaction stock and the monomer pre-emulsion.

Table IIIA shows the respective amounts of the reaction stock, of the pre-emulsion and of the NaPDS solution added in the initiation phase.

The pre-emulsion coagulates at the start of the polymerisation: thus, it was not possible to obtain a polymer dispersion.

Following the coagulation, the presence of two distinct phases was observed: a turbid aqueous supernatant and coarse flakes of polymer at the bottom of the reactor.

No further analyses were carried out on the polymer.

Example 4

Polymerisation According to the Process of the Invention

Salt dissolved in the monomer pre-emulsion was fed in during the polymerisation.

The monomers used were as follows: BA, MAA, HEMA, S, as a mixture with the crosslinking agent TEGDMA.

The amounts of monomers used, and the composition of the monomer mixture as a percentage by weight, are given in Table I.

Table II shows the amounts of the various compounds that were added to prepare the reaction stock and the monomer pre-emulsion.

Tables III and IV show the respective amounts of the reaction stock, of the pre-emulsion, of the other reagents and of the water that were added during the polymerisation phase.

The final scrubbing of the monomers was performed by adding 30 g of 13% TBHP solution and 80 g of 4% SFS solution over the times respectively indicated in Example 1.

Table V shows the characteristics of the polymer dispersion obtained: the solids content, the Brookfield viscosity, determined with a No. 2 spindle at 100 rpm, the particle sizes, the micro-aggregate (ppm) and the Tg in ° C. of the polymer.

Example 5

Polymerisation According to the Process of the Invention

A mixture containing substantially the same amounts of monomers as that of Comparative Example 3 was used.

The amounts of monomers used and the composition of the monomer mixture in percentages by weight are given in Table I.

Table II shows the amounts of the various compounds that were added to prepare the reaction stock and the monomer pre-emulsion.

Tables III and IV show the respective amounts of the reaction stock, of the pre-emulsion, of the other reagents and of water that were added during the polymerisation phase.

The final scrubbing of the monomers was performed by adding 35 g of 13% TBHP solution and 85 g of 4% SFS solution over the times respectively indicated in Example 1.

Table V shows the characteristics of the polymer dispersion obtained: the solids content, the Brookfield viscosity, determined using a No. 2 spindle at 100 rpm, the particle sizes, the micro-aggregate (ppm) and the Tg in ° C. of the polymer.

Example 6

Polymerisation According to the Process of the Invention Using a Fraction of Salt in the Reaction Stock The monomers used were as follows: 2-ethylhexyl acrylate (2-EHA), acrylic acid (AA), HEMA and S, as a mixture with the crosslinking agent TEGDMA.

The amounts of monomers used and the composition of the monomer mixture in percentages by weight are given in Table I.

Table II shows the amounts of the various compounds that were added to prepare the reaction stock and the monomer pre-emulsion.

Tables III and IV show the respective amounts of the reaction stock, of the pre-emulsion, of the other reagents and of water that were added during the polymerisation phase.

The final scrubbing of the monomers was performed by adding 35 g of 13% TBHP solution and 85 g of 4% SFS solution over the times respectively indicated in Example 1.

Table V shows the characteristics of the polymer dispersion obtained: the solids content, the Brookfield viscosity, determined using a No. 3 spindle at 20 rpm, the particle sizes, the micro-aggregate (ppm) and the Tg in ° C. of the polymer.

Example 7

Production of a Polymer Dispersion with a Solids Content of 70% by the Process of the Invention The monomers used were as follows: BA, MMA, MAA and HEMA, as a mixture with the crosslinking agent TEGDMA.

The amounts of monomers used and the composition of the monomer mixture in percentages by weight are given in Table I.

Table II shows the amounts of the various compounds that were added to prepare the reaction stock and the monomer pre-emulsion.

Tables III and IV show the respective amounts of the reaction stock, of the pre-emulsion, of the other reagents and of water that were added during the polymerisation phase.

The final scrubbing of the monomers was performed by adding 35 g of 13% TBHP solution and 85 g of 4%. SFS solution over the times respectively indicated in Example 1.

Table V shows the characteristics of the polymer dispersion obtained: the solids content, the Brookfield viscosity, determined using a No. 3 spindle at 20 rpm, the particle sizes, the micro-aggregate (ppm) and the Tg in ° C. of the polymer.

Example 8

Production of a Polymer Dispersion Containing a Polymer with a Tg>0° C.

The monomers used were as follows: BA, MMA, MAA and HEMA, as a mixture with the crosslinking agent TEGDMA.

The amounts of monomers used and the composition of the monomer mixture in percentages by weight are given in Table I.

Table II shows the amounts of the various compounds that were added to prepare the reaction stock and the monomer pre-emulsion.

Tables III and IV show the respective amounts of the reaction stock, of the pre-emulsion, of the other reagents and of water that were added during the polymerisation phase.

The final scrubbing of the monomers was performed by adding 35 g of 13% TBHP solution and 85 g of 4% SFS solution over the times respectively indicated in Example 1.

Table V shows the characteristics of the polymer dispersion obtained: the solids content, the Brookfield viscosity, determined using a No. 2 spindle at 100 rpm, the particle sizes, the micro-aggregate (ppm) and the Tg in ° C. of the polymer.

Example 9

Polymerisation According to the Process of the Invention by Adding Salt to the Pre-Emulsion before the Initiation The monomers used were as follows: BA, MMA, MAA and HEMA, as a mixture with the crosslinking agent TEGDMA.

The amounts of monomers used and the composition of the monomer mixture in percentages by weight are given in Table I.

Table II shows the amounts of the various compounds that were added to prepare the reaction stock and the monomer pre-emulsion.

Tables III and IV show the respective amounts of the reaction stock, of the pre-emulsion, of the other reagents and of water that were added during the polymerisation phase.

The final scrubbing of the monomers was performed by adding 35 g of 13% TBHP solution and 85 g of 4% SFS solution over the times respectively indicated in Example 1.

Table V shows the characteristics of the polymer dispersion obtained: the solids content, the Brookfield viscosity, determined using a No. 2 spindle at 100 rpm, the particle sizes, the micro-aggregate (ppm) and the Tg in ° C. of the polymer.

Example 10

Process for Obtaining the Aqueous Polymer Dispersions According to the Invention Using the Basic Salt NaHCO$_3$ Example 9 is repeated, but adding the salt in pre-emulsion after the initiation. The amounts of the compounds used and their modes of addition, except for the salt, are the same as in Example 9.

The times of the various phases are also the same as those of the reference example.

Table V shows the characteristics of the polymer dispersion obtained: the solids content, the Brookfield viscosity, determined using a No. 2 spindle at 100 rpm, the particle sizes, the micro-aggregate (ppm) and the Tg in ° C. of the polymer.

Comparative Example 11

A pre-emulsion was prepared using the same amounts of monomers, of crosslinking agent and of the two solutions of Emulan® as described in Comparative Example 3.

With respect to this example in the preparation of the pre-emulsion, the amount of demineralised water used was varied, which was 920 g instead of 800 g, and an amount of Dowfax® 2A1 45% solution of 90 g was added to the pre-emulsion.

In addition, the remaining portion of the pre-emulsion was fed into the reactor without modification, and thus the mixture consisting of 45% Dowfax® 2A1 solution and demineralized water was not added, as was programmed in Example 3.

The other solutions, phases of the process and relative times are the same as those of Example 3.

Table IIA shows the amounts of the various compounds that were added to prepare the reaction stock and the monomer pre-emulsion.

Tables IIIA and IVA show the respective amounts of the reaction stock, of the pre-emulsion, of the other reagents and of water that were used during the polymerisation phase.

During the polymerisation, to maintain the viscosity within acceptable limits and to complete the polymerisation process, it was necessary to add 480 g of demineralised water to the reactor.

At the end of the polymerisation, it was observed that there was a large block of polymer material (macro-aggregate) in the reactor.

The total amount of the said material was about 140 g.

The final scrubbing of the monomers was performed by adding 35 g of 13% TBHP solution and 85 g of 4% SFS solution over the times respectively indicated in Example 1.

Table VA shows the characteristics of the polymer dispersion obtained: the solids content, the Brookfield viscosity, determined using a No. 5 spindle at 20 rpm, the particle sizes, the micro-aggregate (ppm) and the Tg in ° C. of the polymer.

TABLE I

Composition of the monomer mixture in grams and as a percentage by weight of each monomer

| Com-pound | Ex. 1A/2 comparative | | Ex. 3 comparative | | Ex. 4 | | Ex. 5 | | Ex. 6 | | Ex. 7 | | Ex. 8 | | Ex. 9/10 | |
|---|---|---|---|---|---|---|---|---|---|---|---|---|---|---|---|---|
| | g | % | g | % | g | % | G | % | g | % | g | % | g | % | g | % |
| BA | 4320 | 86.6 | 4500 | 85.5 | 4320 | 86.6 | 4500 | 85.7 | — | — | 5000 | 86.2 | 2900 | 55.1 | 4500 | 85.5 |
| MMA | — | — | 600 | 11.4 | — | — | 600 | 11.4 | — | — | 650 | 11.2 | 2200 | 41.8 | 600 | 11.4 |
| 2-EHA | — | — | — | — | — | — | — | — | 4500 | 86 | — | — | — | — | — | — |
| MAA | 68 | 1.4 | 75 | 1.4 | 68 | 1.4 | 75 | 1.4 | — | — | 80 | 1.4 | 75 | 1.4 | 75 | 1.4 |
| AA | — | — | — | — | — | — | — | — | 80 | 1.5 | — | — | — | — | — | — |
| TEGDMA | 10 | 0.2 | 32 | 0.6 | 10 | 0.2 | 20 | 0.4 | 20 | 0.4 | 11 | 0.2 | 32 | 0.6 | 32 | 0.6 |
| HEMA | 50 | 1 | 55 | 1.1 | 50 | 1.0 | 55 | 1 | 60 | 1.1 | 60 | 1.0 | 55 | 1 | 55 | 1 |
| S | 540 | 10.8 | — | — | 540 | 10.8 | — | — | 570 | 10.9 | — | — | — | — | — | — |
| Total g | 4988 | | 5262 | | 4988 | | 5250 | | 5230 | | 5801 | | 5262 | | 5262 | |

BA = butyl acrylate;
MMA = methyl methacrylate;
2-EHA = 2-ethylhexyl acrylate;
MAA = methacrylic acid;
AA = acrylic acid;
TEGDMA = triethylene glycol dimethacrylate;
HEMA = hydroxyethyl methacrylate;
S = styrene.

TABLE II

Examples of the invention: amount in grams of the components, of demineralized water and of the solutions of components used to prepare the "reaction stock" solution and the monomer pre-emulsion

| | Ex. 4 | Ex. 5 | Ex. 6 | Ex. 7 | Ex. 8 | Ex. 9/10 |
|---|---|---|---|---|---|---|
| Reaction stock | | | | | | |
| water | 800 | 950 | 900 | 950 | 950 | 950 |
| Dowfax ® 2A1 (45% solution by weight) | 0.2 | 0.2 | 0.2 | 0.2 | 0.2 | 0.2 |
| sodium sulphate | — | — | 5 | — | — | — |
| Pre-emulsion | | | | | | |
| water | 930 | 800 | 900 | 800 | 800 | 800 |
| monomer mixture (see Table I) | 4988 | 5250 | 5230 | 5801 | 5262 | 5262 |
| Emulan ® 2080 (80% solution by weight) | 44 | 50 | 50 | 50 | 50 | 50 |
| Emulan ® 4070 (70% solution by weight) | 17 | 20 | 20 | 20 | 20 | 20 |
| sodium sulphate | — | — | — | — | — | 10(*) |
| Dowfax ® 2A1 (45% solution by weight) | — | — | — | — | — | — |
| Total grams of pre-emulsion | 5979 | 6120 | 6200 | 6671 | 6132 | 6142 |

(*)In Ex. 10 the same amount, but of a different salt (NaHCO$_3$), is added in phase C.2

TABLE IIA

Comparative examples of the invention: amount in grams of the components, of demineralized Water and of the solutions of components used to prepare the "reaction stock" solution and the monomer pre-emulsion

| | Comparative Ex. 1A | Comparative Ex. 2 | Comparative Ex. 3 | Comparative Ex. 11 |
|---|---|---|---|---|
| Reaction stock | | | | |
| water | 900 | 960 | 950 | 950 |
| Dowfax ® 2A1 (45% solution by weight) | 0.2 | 0.2 | 0.2 | 0.2 |
| sodium sulphate | — | — | 10 | 10 |
| Pre-emulsion | | | | |
| water | 900 | 1000 | 800 | 920 |
| monomer mixture (see Table I) | 4988 | 4988 | 5252 | 5262 |
| Emulan ® 2080 (80% solution by weight) | 44 | 44 | 50 | 50 |
| Emulan ® 4070 (70% solution by weight) | 17 | 17 | 20 | 20 |

TABLE IIA-continued

Comparative examples of the invention: amount in grams of the components, of demineralized Water and of the solutions of components used to prepare the "reaction stock" solution and the monomer pre-emulsion

|  | Comparative Ex. 1A | Comparative Ex. 2 | Comparative Ex. 3 | Comparative Ex. 11 |
|---|---|---|---|---|
| sodium sulphate | — | — | — | — |
| Dowfax ® 2A1 (45% solution by weight) | — | — | — | 90 |
|  |  |  |  | — |
| Total grams of pre-emulsion | 5949 | 6049 | 6132 | 6342 |

TABLE III

Examples of the invention: phase of initiation and of polymerization of the monomer Pre-emulsion: amount of the pre-emulsion, of water and of the other components and Solutions of components used in the abovementioned phases and relative reaction times. The amounts in the table are expressed in grams.

|  | Ex. 4 | Ex. 5 | Ex. 6 | Ex. 7 | Ex. 8 | Ex. 9/10 |
|---|---|---|---|---|---|---|
| C.1 Initiation phase |  |  |  |  |  |  |
| reaction stock (Table II) | 800.2 | 950.2 | 905.2 | 950.2 | 950.2 | 950.2 |
| pre-emulsion (Table II) | 200 | 200 | 300 | 200 | 200 | 200 |
| NaPDS (10% solution by weight) | 22 | 22 | 22 | 22 | 22 | 22 |
| C.2 Polymerization |  |  |  |  |  |  |
| Solution added to the pre-emulsifier: |  |  |  |  |  |  |
| water | 80 | 45 | 100 | 45 | 120 | 120 |
| Dowfax ® 2A1 (45% solution by weight) | 75 | 90 | 90 | 90 | 90 | 90 |
| sodium sulphate | 10 | 10 | 5 | 10 | 10 | —(**) |

(**)In phase C.2 of Ex. 10, 10 g of NaHCO$_3$ are added.

TABLE IIIA

Comparative examples of the invention: phase of initiation and of polymerization of the monomer pre-emulsion: amount of the pre-emulsion, of water and of the other components and solutions of components used in the abovementioned phases and relative reaction times. The amounts in the table are expressed in grams.

|  | Comparative Ex. 1A | Comparative Ex. 2 | Comparative Ex. 3 | Comparative Ex. 11 |
|---|---|---|---|---|
| C.1 Initiation phase |  |  |  |  |
| reaction stock (Table IIA) | 900.2 | 960.2 | 960.2 | 960.2 |
| pre-emulsion (Table IIA) | 200 | 200 | 200 | 200 |
| NaPDS (10% solution by weight) | 22 | 22 | 22 | 22 |
| C.2 Polymerization |  |  | (**) |  |
| Solution added to the pre-emulsifier: |  |  |  |  |
| water |  | 80 | 60 |  | — |
| Dowfax ® 2A1 (45% solution by weight) | 75 | 65 |  | — |
| sodium sulphate | — | — |  | — |

(**) The pre-emulsion coagulated at the start of the polymerisation and formed two separate phases.

TABLE IV

Examples of the invention: polymerization phase of the monomer pre-emulsion: amount of the pre-emulsion, of water and of the other components and solutions of components used and relative reaction times. The amounts in the table are expressed in grams; the times for the various phases are expressed in minutes.

|  | Ex. 4 | Ex. 5 | Ex. 6 | Ex. 7 | Ex. 8 | Ex. 9/10 |
|---|---|---|---|---|---|---|
| 1st polymerization phase |  |  |  |  |  |  |
| duration (minutes): | 30 | 30 | 30 | 30 | 30 | 30 |
| feed: |  |  |  |  |  |  |
| pre-emulsion | 300 | 300 | 300 | 300 | 300 | 300 |
| NaPDS (5% solution by weight) | 37 | 39 | 39 | 36 | 37 | 37 |
| 2nd polymerization phase |  |  |  |  |  |  |
| duration (minutes): | 270 | 270 | 270 | 300 | 270 | 270 |
| feed: |  |  |  |  |  |  |
| pre-emulsion | 5634 | 5765 | 5785 | 6316 | 5852 | 5852 |
| NaPDS (5% solution by weight) | 334 | 351 | 351 | 358 | 358 | 358 |
| water (pre-emulsifier wash) | 100 | 90 | 90 | 90 | 90 | 90 |
| C.3 Scrubbing of monomers |  |  |  |  |  |  |
| (5% NaPDS solution) | 49 | 52 | 52 | 48 | 47 | 47 |

TABLE IVA

Comparative examples of the invention: polymerization phase of the monomer pre-emulsion: amount of the pre-emulsion, of water and of the other components and solutions of components used and relative reaction times. The amounts in the table are expressed in grams; the times for the various phases are expressed in minutes.

|  | Comparative Ex. 1A | Comparative Ex. 2 | Comparative Ex. 3 | Comparative Ex. 11 |
|---|---|---|---|---|
| 1st polymerization phase |  | (1) |  |  |
| duration (minutes): | 30 |  |  | 30 |
| feed: |  |  |  |  |
| pre-emulsion | 300 |  |  | 300 |
| NaPDS (5% solution by weight) | 37 |  |  | 37 |
| 2nd polymerization phase |  |  |  |  |
| duration (minutes): | 270 | 300 |  | 270 |
| feed: |  |  |  |  |
| pre-emulsion | 5604 | 5874 |  | 5842 |
| NaPDS (5% solution by weight) | 334 | 355 |  | 358 |
| water (pre-emulsifier wash) | 100 | 100 |  | 90 |
| C.3 Scrubbing of monomers |  |  |  |  |
| (5% NaPDS solution) | 49 | 47 | 49 | 47 |

(1) The 1st polymerization phase is absent from this example: 30 minutes after the end of the initiation phase, a mixture of 20 g of water and 10 g of Dowfax ® 2A1 (45% solution by weight) was added to the reactor, followed, immediately after the final addition, by 100 g of pre-emulsion with 44 g of 10% NaPDS solution (2nd initiation).

TABLE V

Characterization of the polymer dispersions of the examples of the invention: solids content, determined as a percentage by weight, Brookfield viscosity at 23° C. in mPa · s, Tg of the polymer in ° C., content of micro-aggregate in ppm and mean particle diameter distribution in nm.

|  | Ex. 4 | Ex. 5 | Ex. 6* | Ex. 7 | Ex. 8 | Ex. 9 | Ex. 10 |
| --- | --- | --- | --- | --- | --- | --- | --- |
| solids content (% by weight) | 66.8 | 68.0 | 68.1 | 69.9 | 68.2 | 67.0 | 67.1 |
| Brookfield viscosity (mPa · s × $10^{-2}$) | 1.9 | 1.55 | 12.5 | 19.9 | 3.8 | 1.65 | 1.8 |
| Tg (° C.) | −29.4 | −29.4 | −53.7 | −34.1 | 10.8 | −28.5 | −28.3 |
| Micro-aggregate content (ppm) | 150 | 65 | 160 | 180 | 64 | 96 | 22 |
| Mean particle diameters |  |  |  |  |  |  |  |
| 1) mean diameter nm | 195 | 135 | 160 | 200 | 455 | 140 | 150 |
| % total particles | 28% | 13% | 10% | 33% | 5% | 20% | 22% |
| 2) mean diameter nm | 390 | 385 | 385 | 420 | 630 | 580 | 540 |
| % total particles | 3% | 4% | 35% | 11% | 95% | 80% | 78% |
| 3) mean diameter nm | 550 | 555 | 800 | 585 | — | — | — |
| % total particles | 69% | 83% | 55% | 56% | — | — | — |
| 4) mean diameter nm | — | — | — | — | — | — | — |
| % total particles | — | — | — | — | — | — | — |

*On account of the presence of particles having a mean diameter of about 800 nm, the determination of the particle, diameters and the evaluation of the relative weight proportions were carried out in this case by transmission electron microphotography

TABLE VA

Characterization of the polymer dispersions of the comparative examples of the invention: solids content, determined as a percentage by weight, Brookfield viscosity at 23° C. in mPa.s, Tg of the polymer in ° C., content of micro-aggregate in ppm and mean particle diameter distribution in nm.

|  | Comp. Ex. 1A | Comp. Ex. 2 | Comp. Ex. 11 |
| --- | --- | --- | --- |
| solids content (% by weight) | 66.1 | 64.7 | 64.4 |
| Brookfield viscosity (mPa.s × $10^{-2}$) | 210 | 88 | 99 |
| Tg (° C.) | −27.8 | −27.8 | −29.4 |
| Micro-aggregate content (ppm) | 700 | 540 | 85 |
| Mean particle diameters |  |  |  |
| 1) mean diameter nm | 160 | 260 | <200 |
| % total particles | 8% | 59% | 0% |
| 2) mean diameter nm | 270 | 425 | 350 |
| % total particles | 54% | 41% | 100% |
| 3) mean diameter nm | 400 | — | >500 |
| % total particles | 38% | — | 0% |
| 4) mean diameter nm | — | — | — |
| % total particles | — | — | — |

The invention claimed is:

1. Process for obtaining an aqueous polymer dispersion having the following properties:
   a solids content of from 65% to 75% by weight;
   Brookfield viscosity of less than 3 000 mPa·s, measured at 23° C. under the following conditions: up to 400 mPa·s using a No. 2 spindle at 100 rpm, from 400 to 700 mPa·s using a No. 2 spindle at 20 rpm, from 700 to 3 000 mPa·s using a No. 3 spindle at 20 rpm;
   content of micro-aggregates of less than 500 ppm;
   content of wet macro-aggregates, relative to the weight of the final dispersion, of less than 0.2% by weight;
   the particles of the said dispersion having a polymodal distribution of the mean diameter, and the following distribution of the mean diameters:
   mean diameter of less than 300 nm: from 0 to 40% by weight,
   mean diameter from 300 to 500 nm: from 0 to 40% by weight,
   mean diameter of greater than 500 nm: from 40 to 95% by weight,
   the sum of the percentages of the particles being 100% by weight,
   the said process being carried out by free-radical polymerization in aqueous emulsion of unsaturated monomers, according to the following steps:
   (a) forming of a pre-emulsion of monomers in water using surfactants, where a water-soluble salt can be optionally added from this stage, said salt being soluble in water at 25° C. to at least 1% by weight;
   (b) transferring into the polymerization reactor with stirring, in the following order, of the following aqueous phases:
   reaction stock consisting of a solution of a surfactant, in an amount by weight relative to the weight of final polymer dispersion, of from 1 to 15%; optionally with an added salt which is soluble in water at 25° C. to at least 1% by weight and is inert under the reaction conditions; the salt/surfactant (s/s) weight ratio in the reaction stock being less than 70;
   a portion of the pre-emulsion prepared in the previous phase, in an amount of from 1% to 10% by weight of the initial pre-emulsion;
   C.1
   initiating the polymerization, by adding free-radical initiators which is activated thermally, chemically or by UV irradiation;
   C.2
   polymerizing the monomer mixture, by gradually adding into the reactor, separately, the initiator solution and the remaining portion of the pre-emulsion with an added salt, which is soluble in water at 25° C. to at least 1% by weight and is inert under the reaction conditions, in an amount so as to have a salt concentration in the added pre-emulsion, expressed as a percentage by weight, of from 0.02 to 0.25%; the polymerization temperature generally being from about 30° C. to about 90°C.;
   C.3
   Scrubbing of the residual monomers.

2. Process according to claim 1, in which the salt is added only to the pre-emulsion during phase C.2.

3. Process according to claim 1, in which the amount of salt that is soluble in water to at least 1% by weight at 25° C. is in a weight concentration, relative to the total weight of the polymer dispersion, of from about 0.01 to about 1% by weight.

4. Process according to claim 1, in which the pre-emulsion in phase C.2 is fed into the reactor at a constant flow or at a rate gradient.

5. Process according to claim 1, in which the salts that are soluble in water to at least 1% by weight at 25° C. are either mineral or organic, neutral, basic or acidic salts.

6. Process according to claim 5, in which the salts are chosen from mineral salts and salts of mineral cations with $C_1$–$C_4$ monocarboxylic and $C_2$–$C_4$ dicarboxylic aliphatic acids.

7. Process according to claim 1, in which the ethylenically unsaturated monomers used are esters of monocarboxylic or dicarboxylic α, β-unsaturated $C_3$–$C_{10}$ aliphatic acids with $C_1$–$C_{12}$ aliphatic alkanols or $C_5$–$C_8$ cycloaliphatic alkanols, optionally in the presence of other ethylenic monomers, 8. Process according to claim 7, in which at Least 70% by weight of the monomer emulsion consists of esters as defined in claim 7, optionally in the presence of aliphatic acids of claim 7.

9. Process according to claim 7, in which the weight ratio of the acid to the ester ranges from about 1:10 to about 1:350.

10. Process according to claim 7, in which the other ethylenic monomers are chosen from one or more of the following: vinylaromatic monomers, $C_1$–$C_{12}$ alkyl vinyl ethers, vinyl esters of $C_1$–$C_{18}$ aliphatic monocarboxylic acids, α, β-unsaturated monocarboxylic and dicarboxylic $C_3$–$C_{10}$ aliphatic acid amides, hydroxyl esters of α, β-unsaturated monocarboxylic and dicarboxylic $C_3$–$C_{10}$ acids with $C_2$–$C_{12}$ alkanediols, α, β-unsaturated monocarboxylic and dicarboxylic $C_3$–$C_{10}$ acid nitriles.

11. Process according to claim 7, in which crosslinking monomers are added to the monomer mixture in amounts not greater than 3% by weight relative to the monomer mixture.

12. Process according to claim 7, in which the monomer mixture has the following composition:
   from 70 to 99.7% by weight of at least one ester of (meth)acrylic acid with $C_1$–$C_{12}$ alkanols;
   from 0.3 to 5% by weight of (meth)acrylic acid;
   from 0 to %5 by weight of hydroxyl esters of(meth)acrylic acid with $C_1$–$C_{12}$ alkanols;
   from 0 to 2% of a monomer with crosslinking properties;
   from 0 to 15% by weight of styrene;
   from 0 to 15% by weight of vinyl acetate.

13. Process according to claims 1, in which the surfactants are chosen from the group of nonionic and/or anionic or cationic surfactants or mixtures thereof, and protective colloids are also optionally used.

14. Process according to claim 13, in which the total amount of surfactants and optional protective colloids is from 0.5 to 5%, as a percentage by weight relative to the polymer dispersion.

15. Process according to claim 1, in which an agent for controlling the length of the polymer chain and its molecular weight, is optionally used in an amount of from 0.01 to 5% by weight relative to the monomer mixture.

\* \* \* \* \*